United States Patent Office 3,540,916
Patented Nov. 17, 1970

3,540,916
PROCESS FOR MANUFACTURING ARTIFICIAL LEATHERS
Kazuo Fukada, Takarazuki-shi, Hyogo, Yoshiaki Sakata, Osaka-shi, Osaka, Yoshio Yamada, Nishinomiya-shi, Hyogo, and Noribumi Hakoda, Takatsuki-shi, Osaka, Japan, assignors to The Toyo Rubber Industry Co., Ltd., Osaka, Japan
No Drawing. Filed Nov. 6, 1967, Ser. No. 680,967
Claims priority, application Japan, Nov. 12, 1966, 41/74,600
Int. Cl. D06n 3/04; B42d 1/44
U.S. Cl. 117—63                    15 Claims

ABSTRACT OF THE DISCLOSURE

A process for manufacturing artificial leathers comprising mixing into a solution of a polyurethane elastomer maintained at 25–40° C., a solution in a solvent for said polyurethane elastomer of a polyamide which is capable of being dissolved in said solvent at temperatures of at least 65° C., maintaining said polyamide solution in the solution state to form a coating composition containing the polyamide in the proportion of 15–50 parts by weight per 100 parts by weight of the polyurethane elastomer, applying said coating composition to a base material, soaking the thus coated base material in a liquid which is miscible with the solvent in the coating composition, but is non-solvent for the polymeric components in said coating composition and for said base material to effect coagulation of polymeric components, then extracting the solvent from the coated product, and washing and drying the coated product.

BACKGROUND OF THE INVENTION

Field of the invention

This invention relates to a process for manufacturing artificial leathers and, more particularly, it is concerned with a process for manufacturing artificial leathers having high moisture permeability, and the external appearance and texture of natural leathers.

Description of the prior art

The conventional processes for the manufacture of artificial leathers can be classified roughly into a so-called dry process in which a polymeric material is directly applied to a base material, e.g., by calendering, and a so-called wet process in which a polymeric material, in the form of a solution, is applied to a base material, and the base material so coated is treated with a non-solvent to coagulate the polymeric material. Recently, many investigations have been made on the wet process and many improvements have been developed since the wet process has been recognized as an excellent process for the production of artificial leathers having good moisture permeability because of the fact that coating films formed by the wet processes are micro-porous as a rule.

Artificial leathers, of course, must have good tensile strength, abrasion resistance, weathering resistance and other properties. It is also desirable that they have good texture, external appearance and touch, that is to say, a good feel on hand owing to a high moisture permeability and there must arise a beautiful grain and break when folded, as is shown by calf and like high-grade natural leathers. Therefore, there have been widely used wet processes for the production of artificial leathers in which a non-solvent is added to a polymer solution to form a coating composition consisting of a colloidal solution in a mixture of a solvent and non-solvent, and a coating film of a microporous structure is formed by coagulation of the coating composition. However, this process requires troublesome considerations in the preparation of the coating composition and has many disadvantages from a practical aspect, because it is necessary to regulate precisely the amount of a non-solvent to be added to a polymer solution, since the characteristics of the coating film of the final product are influenced to a great extent by the amount of the non-solvent, and the colloidal polymer solution in a mixture of a solvent and a non-solvent has poor storage stability.

SUMMARY OF THE INVENTION

In the process of the present invention, first there is prepared a coating of composition using a homogenous solution medium, i.e., a common solvent for both a polyurethane elastomer and a polyamide at a high temperature to obtain a stable colloidal solution free from such defects. The coating composition is then applied to a base material and treated with a non-solvent to form a microporous coating film.

More specifically, the process of the present invention is a process for manufacturing artificial leathers comprising:

(a) Mixing into a solution of a polyurethane elastomer in a common solvent maintained at a temperature of 25–40° C., a solution of a polyamide in the solvent which is soluble in the solvent for the polyurethane elastomer at a temperature above 65° C., (b) Maintaining the said polyamide solution in a solution state to prepare a coating composition containing the polyamide in the proportion of 15–50 parts by weight per 100 parts by weight of polyurethane elastomer, (c) Applying the coating composition to a base material, (d) Treating the so coated base material with a liquid which is miscible with the solvent in the coating composition, but is non-solvent both for the polymeric components in the coating composition and for the base material, to coagulate the polymeric components, and (e) After sufficient extraction of the solvent, washing and drying the coated product.

DETAILED DESCRIPTION OF THE INVENTION

Here, in this specification, the term "polyurethane elastomer" means so-called polyurethane-urea elastomers obtainable by reacting a polyether glycol or polyester glycol with an organic diisocyanate to form an isocyanate-terminated prepolymer and reacting the prepolymer in block or in solution with a chain extender, such as water, low molecular glycols or low molecular diamines, or by reacting such reactants in one shot without passing through a prepolymer stage. The polyurethane elastomer thus obtained is dissolved to form a solution in a solvent, such as N,N-dimethylformamide N,N-dimethylacetamide, N,N - diethylformamide, dimethylsulfoxide tetramethylurea, tetrahydrofuran, acetonitrile or a mixture thereof.

On the other hand, a polyamide which is insoluble in such solvents at room temperature, but is soluble at temperatures of at least 65° C., is chosen and dissolved in such a common solvent, which may be the same as or different from the solvent used in the preparation of the polyurethane elastomer solution, to provide a solution. The polyamide solution, while maintaining it at an elevated temperature to keep it in the solution state, is added to and mixed in the polyurethane elastomer solution maintained at a temperature of 25–40° C. The coating composition thus obtained, is a uniform dispersion of micro-globules formed by coagulation of the polyamide caused by the temperature differential between the temperatures before and after the mixing of the two polymeric solutions into the polyurethane elastomer solution. The globules of polyamide serve as nuclei of coagulation so that the resulting coating film is of a very uniform micro-porous structure. The polyamide which will be used in the embodiment of the present invention may be exemplified by 6-nylon, 6,6-nylon, 6,10-nylon and copolymers thereof.

The mixing of the solution of polyurethane or polyurea with the solution of polyamide may be attained by maintaining the solution of polyurethane or polyurea at a temperature of 25–40° C., and stirring thereinto, by means of propeller mixer, turbine mixer or ribbon mixer, the solution of polyamide maintained at an elevated temperature so as to retain its solution state. The polyamide may be added in the amount of 15–50 parts by weight per 100 parts by weight of polyurethane elastomer. When the polyamide is added in an amount less than 15 parts by weight, the resulting coating composition will hardly afford a micro-porous coating film and, on the contrary, when added in an amount of more than 50 parts by weight, the resulting coating composition will give a rigid film of poor flexibility, so that it will become impossible to obtain a soft and pliable artificial leather.

The coating composition is applied to a base material by any suitable means, e.g., by doctor knife or reverse coater.

The base material suitably used includes woven fabrics, knitted fabrics, non-woven fabrics, papers and the like. Preferably used are piled or napped woven fabrics, needle-punched non-woven fabrics where fibers have been three-dimensionally reticulated, and those obtained by applying a polymeric material in a conventional manner to such fibrous base materials. The so coated base material is then soaked in a liquid which is miscible with the solvent or solvents in the coating composition, but is non-solvent for the polymeric components in the coating composition and for the base material, so as to coagulate the polymeric components in micro-porous state. As the non-solvent to be used in the coagulation there may be exemplified water, methanol, ethanol, ethylene glycol, glycerol and mixtures thereof.

The artificial leather obtained through the series of steps mentioned above in accordance with the present invention has good heat setting properties attributable to that of the nylon in the coating composition, good elasticity attributable to that of polyurethane or polyurea elastomer, and sufficient strength as leather attributable to that of both polymers. In addition, a very uniform micro-porous structure is obtained resulting from uniform and slow mutual penetration and diffusion of the solvent and non-solvent in the coating layer of the coating composition on the base material, attributable to the function as nuclei of coagulation of the globules of the polyamide uniformly dispersed in the coating composition.

In other words, the artificial leather manufactured in accordance with the present invention has close resemblance to natural leathers not only in tensile strength, pliability and other general physical properties, but also in external appearance, texture, touch, and other special properties. In particular, it has breaking property like calf and high-grade natural leathers, and rises in beautiful breaks when folded. It is also superior in moisture and air permeabilities, since it is of a micro-porous nature.

Moreover, the characteristics of the artificial leather manufactured in accordance with the present invention may be further improved by incorporating various additives in the coating composition in accordance with special objects. For instance, the processability of the coating composition and the properties of the final products may be remarkably improved by incorporating in the coating composition a polymeric substance which is soluble in the soluton and solvent for polyurethane elastomer, such as, polyacrylonitrile and its copolymers, cellulose acetate, cellulose acetate butylate, epoxy resin and nitrile rubber.

There may be obtained artificial leathers of very beautiful tints by coloring the artificial leather of the present invention in a textile printing process or in a dip dyeing process, or by previously incorporating a colorant in the coating composition.

The artificial leathers produced in accordance with the present invention are very suitable for use in making shoes, bags, upholstery and in like uses.

The process of the present invention will now be illustrated by the following examples which are illustrative and not limitative.

EXAMPLE 1

One mole of a poly(ethylene adipate) glycol of an average molecular weight of 1,200, 1 mole of 1,4-butanediol, 1 mole of 1,6-hexanediol and 3 moles of diphenylmethane-4,4'-diisocyanate were dissolved in N,N-dimethylformamide to form a 45% solution. The solution was heated with stirring at 50° C., until the viscosity of the solution rose to 9,000 cps. measured at 85° C. Then, to the reaction mixture there was added additional N,N-dimethylformamide, to make the concentration 25%, and, at the same time, 0.05 mole of di-n-butylamine to stop the reaction.

On the other hand, a copolymeric nylon (Amilan CM #4000; Toyo Rayon Co.) was dissolved in N,N-dimethylformamide at 85° C., to form a solution of 25% solids content. The copolymeric nylon solution, maintained at 80° C., was stirred into the 25% solution of polyurethane in N,N-dimethylformamide, maintained at 30° C., using a propeller-type agitator revolving at 1,160 r.p.m., at a rate of 5 parts by weight of the nylon solution per minute per 100 parts of the polyurethane solution, until 30 parts by weight of the nylon solution was introduced into 100 parts by weight of the polyurethane solution.

To the solution mixture there was added and intimately mixed 5% by weight, based on the total weight of the polymers in the solution mixture, of carbon black as a colorant. The coating composition thus obtained was deaerated under reduced pressure and employed for coating. As the base material there was used one that had been prepared by impregnating on both sides a napped cotton flannel with a 15% solution in dimethylformamide of the polyurethane, as prepared in the above mentioned manner, and soaking the so impregnated flannel in water to coagulate the polyurethane. One side of the base material was buffed prior to application of the coating composition and the base material was moistened to a moisture of 40% by weight on a dry basis.

To the unbuffed side of the pretreated base material there was applied the coating composition by means of a doctor knife coater to a thickness of 1.5 mm. Immediately thereafter, the coated base material was soaked in water at 30° C., to effect coagulation of the coating layer. After 15 minutes of soaking, the coated web was soaked in warm water at 70° C., to effect sufficient extraction of N,-N-dimethylformamide, washed, squeezed and then dried in a hot air dryer at 105° C. The artificial leather thus obtained exhibited a very large value of moisture permeability, namely, 1,300 g. $H_2O/m.^2$ 24 hrs. at 40° C., rose in fine breaks as do natural leathers, in the surface of the coating film when folded, and had very excellent texture and touch to the hand. The artificial leather could be made to resemble natural leathers more closely by apply-

EXAMPLE 2

A prepolymer obtained by reacting 1 mole of a poly(propylene ether) glycol with 2 moles of 4,4′-diphenylmethane diisocyanate at 70° C., with stirring for 3½ hours, was dissolved in N,N-dimethylmormamide to form a solution of a solid content of 40% and a free NCO content of 1.75%. Maintaining the solution at 20° C., there was added with stirring 0.8 equivalent, per equivalent of free NCO groups in the solution, of 1,2-propylenediamine in the form of a 10% solution in N,N-dimethylformamide to accomplish chain extension of the prepolymer. To the resulting polyurethane solution there was added additional N,N-dimethylformamide to form a solution of a solids content of 30%. The viscosity of the solution was 23,000 cps. at 30° C.

On the other hand, a 30% solution of a copolymeric nylon (Amilan CM#4000) in N,N-dimethylformamide was provided and was maintained at 80° C.

To the polyurethane solution maintained at 35° C., there was added by means of a ribbon mixer revolving at 350 r.p.m., the solution of copolymeric nylon maintained at 80° C., at a rate of 10 parts by weight per minute per 100 parts by weight of the polyurethane solution until 35 parts by weight of the copolymeric nylon solution was added to 100 parts by weight of the polyurethane solution. To the solution mixture there was then added and intimately admixed, 4% by weight, based on the total weight of the polymers in the solution mixture, of carbon black as a colorant. The coating composition thus obtained was deaerated and put to coating use.

A base material was prepared by superposing a web of a weight of 110 g./m.$^2$ formed of nylon staples (3 den. x 51 mm.) on the un-napped side of a cotton flannel (warp 20 x 45/in.: woof 20/2 x 42/in.) of which a single surface had been napped. The assembly was needled from the side of the web by means of a needle loom to form a composite non-woven fabric which was then impregnated with a 15% solution in N,N-dimethylformamide of the polyether urethane-urea prepared in the manner mentioned above. Immediately thereafter it was soaked in water to coagulate the polymeric material. The composite fabric was then soaked in warm water to fully extract N,N-dimethylformamide and was washed and dried at 100° C. The web side of the composite fabric was then buffed by means of a sandpaper roll. The base material thus formed was moistened to a moisture content of 45% by weight, on a dry basis, prior to application of the coating composition.

To the unbuffed side of the so pretreated base material there was applied, by means of a doctor knife coater, the coating composition to the thickness of 1.7 mm. The coated base material was placed in air at 30° C., and 55% R.H., for 3 minutes and then soaked in water at 40° C., to effect coagulation of the coating layer. After 10 minutes soaking, it was soaked in warm water at 80° C. to fully extract N,N-dimethylformamide, and then was washed, squeezed and dried in a hot air dryer at 105–110° C. After drying, the coated product was embossed using an embossing roll having a grained surface and heated at a surface temperature of 135–140° C. It was then coated by means of a spray gun with a finish comprising an acrylate resin emulsion incorporating a black pigment, and was dried to obtain an artificial leather of a moisture permeability of 890 G. H$_2$O/m.$^2$ 24 hrs. at 40° C. The product had good texture, external appearance and touch, and rose in beautiful breaks in its surface, as do natural leathers when folded.

What is claimed is:

1. A process for manufacturing artificial leathers comprising:
   (a) mixing a solvent solution of a polyamide which is maintained at a temperature of at least 65° C., prior to mixing, into a solvent solution of a polyurethane elastomer, said solvent solution of said polyurethane elastomer being maintained at a temperature of from 25 to 40° C. prior to said mixing,
   whereby there results a coating composition which is maintained at a temperature of less than 65° C., said coating composition comprising a homogeneous solution medium containing said polyamide in a proportion of 15 to 50 parts by weight per 100 parts by weight of said polyurethane elastomer, said polyamide being a uniform dispersion of microglobules formed by the coagulation of said polyamide due to the temperature differential between said solvent solution of said polyurethane elastomer and said solvent solution of said polyamide,
   said solvent for said polyamide being a solvent for said polyurethane elastomer and said solvent for said polyamide, said polyamide being dissolved in said solvent only at temperatures of at least 65° C., and
   (b) applying said coating composition to a base material,
   (c) soaking the thus coated base material in a liquid which is miscible with the solvent in the coating composition, but which is a non-solvent for said polyamide and said polyurethane elastomer in said coating composition and which is also a non-solvent for said base material, to thereby effect coagulation of said polyurethane elastomer and said polyamide,
   (d) then extracting solvent from the coagulated, coated base material, and washing and drying the coagulated, coated base material after the extraction of solvent.

2. A process as in claim 1 in which the polyurethane elastomer is one obtained by reacting a compound selected from the group consisting of a polyether glycol and a polyester glycol with an organic diisocyanate to form an isocyanate-terminated prepolymer, and then reacting the prepolymer with a chain extender.

3. The process of claim 2 wherein said chain extender is selected from the group consisting of water, a low molecular weight glycol, and a low molecular weight diamine.

4. A process as in claim 1 in which the polyurethane elastomer is such that has been obtained by reacting in one shot a compound selected from the group consisting of a polyether glycol and a polyester glycol, with an organic diisocyanate and a chain extender.

5. The process of claim 4 wherein said chain extender is selected from the group consisting of water, a low molecular weight glycol, and a low molecular weight diamine.

6. A process as in claim 1 in which the solvent for the polyurethane elastomer is a solvent selected from the group consisting of N,N-dimethylformamide, N,N-diethylformamide, dimethylsulfoxide, tetramethylurea, tetrahydrofuran acetonitrile and mixtures thereof.

7. A process as in claim 1 in which the polyamide is selected from the group consisting of 6-nylon, 6,6-nylon, 6,10-nylon and copolyamide thereof.

8. A process as in claim 1 in which there is added to the coating composition a polymeric substance selected from the group consisting of polyacrylonitrile and its copolymers, cellulose acetate, cellulose acetate butylate, epoxy resins and nitrile rubber.

9. A process as in claim 1 in which the base material is woven fabric, knitted fabric, non-woven fabric or paper.

10. A process as in claim 1 in which the base material is a piled or napped woven fabric.

11. A process as in claim 1 in which the base material is a non-woven fabric obtained by needle-punching web.

12. A process as in claim 1 in which the non-solvent used in the coagulating step is a member of the group consisting of water, methanol, ethanol, ethylene glycol, glycerol and mixtures thereof.

13. A process as in claim 1 in which there is used a base material obtained by impregnating a woven or non-woven fabric with a solution of a polyurethane elastomer and coagulating the so impregnated fabric in water.

14. The process of claim 1 wherein said solvent for said polyurethane elastomer and said solvent for said polyamide is the same material.

15. The process of claim 1 wherein said solvent for said polyurethane elastomer and said solvent for said polyamide are different materials.

References Cited

UNITED STATES PATENTS

| | | | |
|---|---|---|---|
| 3,000,757 | 9/1961 | Johnston | 260—77.5 X |
| 3,100,721 | 8/1963 | Holden | 264—41 X |
| 3,190,765 | 6/1965 | Yuan | 117—63 |
| 3,265,529 | 8/1966 | Caldwell et al. | 117—135.5 |
| 3,275,468 | 9/1966 | Aoki | 117—63 |
| 3,348,963 | 10/1967 | Fukushima | 117—63 |
| 3,369,925 | 2/1968 | Matsushita | 117—63 |
| 3,377,190 | 4/1968 | Baguley | 117—63 |
| 3,427,179 | 2/1969 | Davis | 117—63 X |

FOREIGN PATENTS 690,347    7/1964    Canada.

WILLIAM D. MARTIN, Primary Examiner

W. R. TRENOR, Assistant Examiner

U.S. Cl. X.R.

117—135.5, 140, 155; 260—77.5; 264—41